United States Patent [19]

Sluma et al.

[11] Patent Number: 5,356,461
[45] Date of Patent: Oct. 18, 1994

[54] GAS SEPARATION MEMBRANE

[75] Inventors: Heinz-Dieter Sluma, Grossostheim; Robert Weinzenhofer, Erlenbach; Alfons Leeb, Kleinwallstadt; Karl Bauer, Dammbach, all of Fed. Rep. of Germany

[73] Assignee: Akzo N.V., Netherlands

[21] Appl. No.: 40,357

[22] Filed: Mar. 30, 1993

Related U.S. Application Data

[62] Division of Ser. No. 798,814, Nov. 27, 1991, Pat. No. 5,242,636.

[30] Foreign Application Priority Data

Nov. 28, 1990 [DE] Fed. Rep. of Germany ....... 4037817

[51] Int. Cl.$^5$ .................. B01D 53/22; B01D 69/12; B01D 71/68
[52] U.S. Cl. .......................... 96/10; 96/13; 55/524
[58] Field of Search .................. 96/7, 8, 10-13; 55/524

[56] References Cited

U.S. PATENT DOCUMENTS

| | | | |
|---|---|---|---|
| 4,602,922 | 7/1986 | Cabasso et al. | 96/13 |
| 4,631,075 | 12/1986 | Yamabe et al. | 96/13 |
| 4,756,932 | 7/1988 | Puri | 96/10 X |
| 4,857,080 | 8/1989 | Baker et al. | 96/12 X |
| 4,863,761 | 9/1989 | Puri | 96/10 X |
| 4,871,378 | 10/1989 | Pinnau | 96/13 X |
| 4,933,082 | 6/1990 | Yamada et al. | 96/12 |
| 5,049,167 | 9/1991 | Castro et al. | 96/12 X |
| 5,061,301 | 10/1991 | Kim et al. | 96/12 |
| 5,085,676 | 2/1992 | Ekiner et al. | 96/13 |
| 5,178,940 | 1/1993 | Matsumoto et al. | 96/13 |

FOREIGN PATENT DOCUMENTS

| | | | |
|---|---|---|---|
| 0144054 | 6/1985 | European Pat. Off. | 96/13 |
| 0152011 | 8/1985 | European Pat. Off. | 96/13 |
| 0174918 | 3/1986 | European Pat. Off. | 96/13 |
| 57-004203 | 1/1982 | Japan | 96/13 |
| 59-059210 | 4/1984 | Japan | 96/13 |
| 61-146321 | 7/1986 | Japan | 96/13 |
| 61-291018 | 12/1986 | Japan | 96/13 |
| 63-214319 | 9/1988 | Japan | 96/13 |

*Primary Examiner*—Robert Spitzer
*Attorney, Agent, or Firm*—Oliff & Berridge

[57] ABSTRACT

A multilayer membrane for separating gas mixtures includes a polymer supporting membrane with a voids volume of more than 50% and a coating of two or more separating layers made of two or more different polymers. A hollow capillary serving as the supporting membrane is guided through the central bore of a spinneret. The spinneret has one or several concentric annular slits and/or annular grooves, through each of which a solution of one of the polymers forming the separating layers is applied to the supporting membrane. The spinneret terminates in a sealed chamber in which the solvent or solvents of the polymer solutions is/are evaporated and removed. The coated supporting membrane is drawn out of the chamber and wound up, possibly following aftertreatment with heat and/or liquids.

5 Claims, 1 Drawing Sheet

GAS SEPARATION MEMBRANE

This is a division of application Ser. No. 07/798,814 filed Nov. 27, 1991, U.S. Pat. No. 5,242,636.

TECHNICAL FIELD

The invention relates to a method for manufacturing a multilayer membrane for separating gas mixtures, and a membrane made by this method. The membrane is comprised of a polymer supporting membrane with a voids volume of more than 50% and a coating of at least two separating layers made of at least two different polymers.

BACKGROUND

A coated membrane is already known from U.S. Pat. No. 3,874,986. This membrane consists of a porous carrier, an ultrathin film of an organopolysiloxane polycarbonate copolymer on the carrier, topped by an ultrathin film, made of polyphenylene oxide. Manufacture is by the "Ward Process," by shaping the polymers on a limited liquid surface. The resultant membrane is suitable for separating gas mixtures, especially mixtures of $O_2$ and $N_2$.

Published European Patent Application No. 0,124,028 describes the manufacture of membranes suitable for gas separation, as well as hollow fibers and hollow capillaries. Manufacture is accomplished by deliberate stretching of thermoplastic crystalline polymers shaped by melting, especially polyolefins.

U.S. Pat. No. 4,230,463 describes the manufacture of multicomponent membranes for gas separation. Porous hollow fibers are dipped for this purpose into a dilute or nondilute coating material which may be drawn into the pores by a vacuum inside the porous hollow fiber. Solvents can then be evaporated off if necessary.

SUMMARY OF THE INVENTION

An object of the present invention was to improve the application of separating layers to a supporting membrane in the form of a hollow capillary in such a way that continuous application in a uniform extremely thin layer is made possible and irregularities in the supporting membrane are compensated thereby.

This and other objects are achieved by a method according to the present invention in which a hollow capillary serving as a supporting membrane is guided through the central bore of a spinneret. The spinneret has one or more concentric annular slits and/or annular grooves, through which a solution of the polymers forming the separating layers is applied to the supporting membrane. The spinneret terminates in a sealed chamber in which the solvent or solvents in the polymer solutions are evaporated and removed. The coated supporting membrane is pulled out of the chamber and possibly wound up for after-treatment with heat and/or liquids.

The method according to the invention produces an absolutely uniform application of the separating layers because dead spaces are eliminated by the annular slits and/or annular grooves and application is not dependent on random surface characteristics of the supporting membranes in dipping. In the method according to the invention, the polymer solution does not age and therefore does not produce inhomogeneities in the coating. These advantages are of particular importance for continuous operation over a long period of time.

BRIEF DESCRIPTION OF THE DRAWINGS

The invention may be better understood in view of the accompanying drawings in which like references refer to like parts.

DETAILED DESCRIPTION OF PREFERRED EMBODIMENTS

Figure 1:
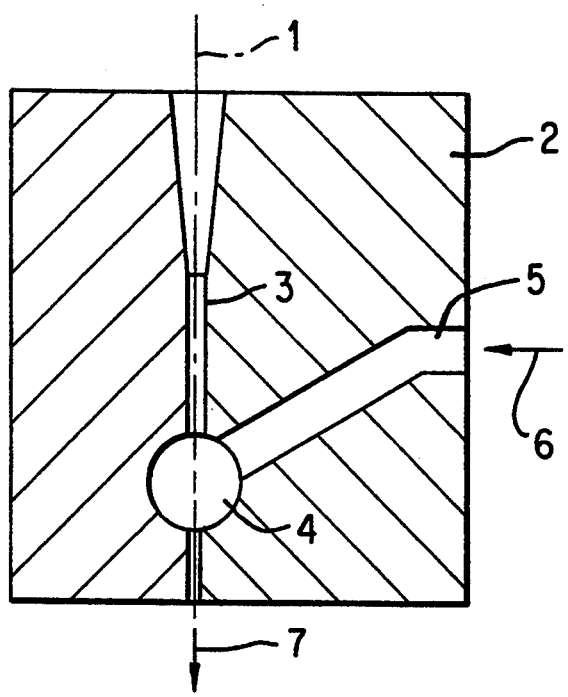
FIG. 1 is a side cross-sectional view of a spinneret for practicing the method of the invention.
Figure 2:
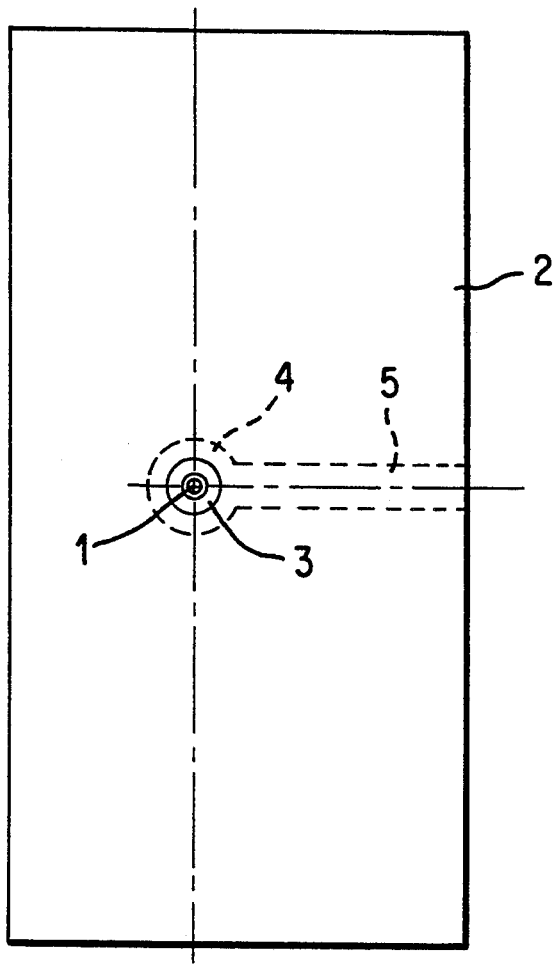
FIG. 2 is a bottom view of the spinneret of FIG. 1.

According to one embodiment of the invention, the solution(s) can be allowed to flow freely out of the annular slits and/or grooves under their own hydrostatic pressure. This is especially suitable when the solution has a low viscosity.

At higher viscosities, the solution(s) is/are preferably extruded from the annular slits and/or grooves under pressure generated by metering pumps. The level of the pressure depends on the slit width, slit length, viscosity of the solution, desired layer thickness, and throughput rate of the supporting membrane. For this reason, in designing the invention, the pressure can be adjusted and kept constant depending on the width of the slit. The constant pressure can also be maintained by a leveling bulb, pump pressure, or a "Gepolster" or widening of the supply channel.

No limit is imposed as far as solvents for the polymer solutions are concerned, provided the solubility is specified. For reasons of toxicology and environmental protection, solvents containing halogens should be avoided whenever possible. Of course the solvent must not attack the supporting membrane. On the other hand, the solvent should be relatively highly volatile to ensure quick evaporation.

Although the polymers used for the separating layers are very different with different chemical structures, it may be advantageous to use the same solvents. This permits a simpler form of recovery.

On the other hand, improved results may be obtained when different solvents are used for the different polymer solutions. This is the case, for example, when differences in viscosity are to be produced.

To produce clearly delimited layers, in one embodiment of the invention, polymer solutions are used which are not miscible with one another or are only slightly miscible with one another.

For gas separation, especially with mixtures of $O_2$ and $N_2$, a number of polymers and polymer combinations have already proven useful. In the scope of the present invention, it has been found to be favorable to use an organic polymer with silane side groups for the layer adjacent to the supporting membrane. Such polymers include, for example, polytrimethylsilylpropyne, polyvinyltrimethylsilane, polymethylsilyl-2-butyne, and 1-methyl-2-(1,1,3,3'-tetramethyl-1,3'-disila-butyl)-acetylene.

Other polymers preferred for coating, used to obtain selective permeability characteristics, include aromatic polyesters and/or aromatic polyimides and/or aromatic polyamides and/or aromatic polysulfones and/or polyphenylene oxides within the scope of the present invention.

To simplify the working of the process, especially when threading the supporting membrane, it is highly advantageous for the spinneret to be designed as a divisible spinneret. Preferably, therefore, to introduce the hollow capillaries that serve as the supporting membrane, the divisible spinneret is opened and then closed again. A spinneret of this kind is also advantageous for cleaning.

It is advantageous both in terms of space requirements and improved maintenance for a spinneret to be used that has a plurality of central bores each having at least two concentric annular slits and/or annular grooves.

A simplification is thus obtained as far as the transport of polymer solutions is concerned in that the respective polymer solution is fed to the corresponding annular slits and/or annular grooves.

If several polymer layers are to be applied, a corresponding number of spinnerets must likewise be disposed along the path of the supporting membrane hollow capillaries. One simplification can be accomplished in accordance with the invention by using a spinneret which has at least two concentric annular slits and/or annular grooves for each central bore, with the annular slits and/or annular grooves terminating at a specific distance from one another. The distance should be so great that mixing of the individual layers is largely avoided.

The invention also encompasses a gas separation membrane manufactured by the method described above. Such a membrane may be composed of the following:

(a) a supporting membrane suitable for coating;

(b) a first coating comprised of a polymer forming the coating layer, said polymer being an organic polymer with silane side groups, with the thickness of the layer being in the range from 0.1 to 10 microns and the layer having a selectivity to $O_2/N_2$ between 1.2 and 3 and an oxygen permeability between 5 and $5000 \cdot 10^{-12}$ m/Pa.s;

(c) a second coating comprised of a polymer forming the coating layer, said polymer being an aromatic polyester and/or an aromatic polyimide and/or an aromatic polyamide and/or an aromatic polysulfone and/or a polyphenylene oxide, with the thickness of the layer being in the range from 0.01 to 1 micron and the layer having a selectivity to oxygen/nitrogen of between 1 and 10 and an oxygen permeability of between 0.1 and $10 \cdot 10^{-12}$ m/Pa.s; and (d) possibly a third coating, comprised of a polymer which differs from at least one of the polymers in the first and second coatings;

with the separation resistance to pressure of the multilayer coating being greater than 5 bars.

In one special embodiment of the invention, the third coating is located between the first and second coatings.

In another special embodiment of the invention, the third coating is applied on top of the second coating.

It is also possible to apply more than three coating layers to the supporting membrane.

EXAMPLE 1

A suitable supporting membrane (hollow fiber) 1 with an outside diameter of 200 microns and a surface pore size of 0.02 micron (determined by an image analysis system) is guided in the direction of arrow 7 through a coating spinneret 2 with a central bore 3 measuring 230 microns in diameter and an annular groove measuring 1 mm in diameter with a pulloff rate of 10 m/min. A solution of 2.5 wt. % polytrimethylsilylpropyne in toluene is fed at a pressure of 0.1 bar through the annular groove 4 at room temperature from a supply channel 5 in the direction of arrow 6. The coated hollow fiber is guided through an infrared dryer in which the solvent is evaporated. The thickness of the applied layer is 2 microns.

The single-coated membrane thus produced can be fed continuously or discontinuously to one or more additional process steps in order to produce a multilayer membrane.

EXAMPLE 2

A single-coated membrane prepared according to Example 1 is fed in a continuously successive processing step through a coating spinneret with a central bore measuring 230 microns in diameter in an annular groove measuring 1 mm in diameter at a pulloff rate of 10 m/min. A solution of 2.5 wt. % polytrimethylsilylpropyne in toluene at a pressure of 0.1 bar is fed through the annular groove at room temperature. The double-coated hollow fiber is conducted through an infrared dryer in which the solvent is evaporated off. The resultant membrane can be wound up and incorporated into gas separation modules. The thickness of the applied layers is 4 microns. The oxygen permeability of the membrane was found to be $50 \cdot 10^{-12}$ m/Pa.s.

EXAMPLE 3

A single-coated membrane prepared according to Example 1 is guided in a continuously-following processing step through a coating spinneret with a central bore measuring 230 microns in diameter and an annular groove measuring 1 mm in diameter at a pulloff rate of 10 m/min. A solution of 1.0 wt. % of a nitrogen-oxygen selective aromatic polyester in dioxane at a pressure of 10 mbar is fed through the annular groove at room temperature. The double-coated hollow fiber is fed through an infrared dryer in which the solvent evaporates. The resultant membrane can be wound up and incorporated into gas separation modules.

The thickness of the applied layers totals about 2 microns. The oxygen permeability of the coated membrane has been found to be $0.2 \cdot 10^{-12}$ m/Pa.s. The selectivity to oxygen and nitrogen was $\alpha_{o2/N2} = 5$.

What is claimed is:

1. A membrane for gas separation, manufactured by guiding a polymeric hollow capillary supporting membrane through a central bore of a spinneret;

sequentially applying at least two solutions, each comprised of a separating layer-forming polymer and at least one solvent, to an external surface of said supporting membrane through at least one concentric annular slit or groove in said spinneret to form a coated supporting membrane coated with a first coating layer, which in turn is coated with a second coating layer; and removing said at least one solvent from said coated supporting membrane to form a gas separation membrane, said gas separation membrane comprising:

said coated supporting membrane;

said first coating layer on said supporting membrane, composed of an organic polymer with silane side groups, a thickness of said first coating layer being in the range from 0.1 to 10 microns and said first coating layer exhibiting a selectivity to $O_2/N_2$ of between 1.2 and 3 and an oxygen permeability of between 5 and $5000 \cdot 10^{-12}$ m/Pa.s; and said second coating layer over said first coating layer, composed of at least one member selected from the group consisting of an aromatic polyester, an aromatic polyimide, an aromatic polyamide, an aromatic polysulfone, and a polyphenylene oxide, a thickness of said second coating layer being in the range between 0.1 and 1 micron and said second coating layer having a selectivity to $O_2/N_2$ of between 1 and 10 and an oxygen permeability of between 0.1 and $10 \cdot 10^{-12}$ m/Pa.s; and a separation resistance of the coating layers to pressure being greater than 5 bars.

2. A membrane for gas separation according to claim 1, further comprising a third coating layer which is composed of a polymer which is different from at least one of the polymers in the first and second coating layers.

3. A membrane for gas separation according to claim 2, wherein the third coating layer is between the first and second coating layers.

4. A membrane for gas separation according to claim 2, wherein the third coating layer is applied on the second coating layer.

5. A membrane for gas separation according to claim 4, wherein additional layers are applied on top of the third layer.

* * * * *

UNITED STATES PATENT AND TRADEMARK OFFICE
CERTIFICATE OF CORRECTION

PATENT NO. : 5,356,461

DATED : October 18, 1994

INVENTOR(S) : Heinz-Dieter Sluma, Robert Weizenhofer, Alfons Leeb and Karl Bauer It is certified that error appears in the above-indentified patent and that said Letters Patent is hereby corrected as shown below:

On the title page:

Item 75 (Inventors), line 2, change second-named inventor's last name "Weinzenhofer" to --Weizenhofer--.

Column 3, line 35, change "m/Pa.s" to --m/Pa·s---, and line 44, change "m/Pa.s" to --m/Pa·s--

Column 4, line 24, change "m/PA.s" to --m/Pa·s--, and line 41, change "m/Pa.s" to --m/Pa·s--.

UNITED STATES PATENT AND TRADEMARK OFFICE
CERTIFICATE OF CORRECTION

PATENT NO. : 5,356,461
DATED : October 18, 1994
INVENTOR(S) : Heinz-Dieter Sluma, et al.

It is certified that error appears in the above-indentified patent and that said Letters Patent is hereby corrected as shown below:

Column 4, Claim 1, line 23, change "m/Pa.s" to --m/Pa·s--, and

Column 5, claim 1, line 33, change "m/Pa.s" to --m/Pa·s--.

Signed and Sealed this

Twenty-fourth Day of January, 1995

Attest:

BRUCE LEHMAN

Attesting Officer                Commissioner of Patents and Trademarks